United States Patent
Kuik et al.

(10) Patent No.: US 11,614,977 B2
(45) Date of Patent: *Mar. 28, 2023

(54) OPTIMIZING CLUSTERED APPLICATIONS IN A CLUSTERED INFRASTRUCTURE

(71) Applicant: Cisco Technology, Inc., San Jose, CA (US)

(72) Inventors: Timothy J Kuik, White Bear Lake, MN (US); Sumit Kala, Sunnyvale, CA (US); Yibin Yang, San Jose, CA (US); Hemanth Basappa Mallikarjunaswamy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 118 days.

This patent is subject to a terminal disclaimer.

(21) Appl. No.: 17/238,617

(22) Filed: Apr. 23, 2021

(65) Prior Publication Data
US 2021/0240541 A1  Aug. 5, 2021

Related U.S. Application Data

(63) Continuation of application No. 16/543,250, filed on Aug. 16, 2019, now Pat. No. 11,016,819.

(51) Int. Cl.
*G06F 9/50* (2006.01)
*G06F 9/455* (2018.01)
*H04L 67/1001* (2022.01)

(52) U.S. Cl.
CPC ........ *G06F 9/5077* (2013.01); *G06F 9/45558* (2013.01); *G06F 9/5088* (2013.01); *H04L 67/1001* (2022.05); *G06F 2009/4557* (2013.01)

(58) Field of Classification Search
CPC .................................................. G06F 9/5077
See application file for complete search history.

(56) References Cited

U.S. PATENT DOCUMENTS 11,108,840 B2 *   8/2021   Shi ......................... H04L 65/75
2001/0023440 A1  9/2001   Franklin et al.
(Continued)

FOREIGN PATENT DOCUMENTS

WO    WO2014202151    12/2014

OTHER PUBLICATIONS

Office Action ofr U.S. Appl. No. 16/543,250, dated Nov. 27, 2020, Kuik, "Optimizing Clustered Applications in a Clustered Infrastructure" < 10 PAges.

(Continued)

*Primary Examiner* — Charlie Sun
(74) *Attorney, Agent, or Firm* — Lee & Hayes, P.C.

(57) ABSTRACT

This disclosure describes techniques for providing virtual resources (e.g., containers, virtual machines, etc.) of a clustered application with information regarding a cluster of physical servers on which the distributed clustered application is running. A virtual resource that supports the clustered application is executed on a physical server of the cluster of physical servers. The virtual resource may receive an indication of a database instance (or other application) running on a particular physical server of the cluster of physical servers that is nearest the physical server. The database instance may be included in a group of database instances that are maintaining a common data set on respective physical servers of the group of physical servers. The virtual resource may then access the database instance on the particular physical server based at least in part on the database instance running on the particular server that is nearest the physical server.

20 Claims, 8 Drawing Sheets

(56) References Cited

U.S. PATENT DOCUMENTS

| | | |
|---|---|---|
| 2011/0276579 A1 | 11/2011 | Colrain et al. |
| 2013/0297596 A1 | 11/2013 | Mouline et al. |
| 2015/0169644 A1 | 6/2015 | Gong et al. |
| 2016/0180245 A1 | 6/2016 | Tereshkov et al. |
| 2020/0241908 A1 | 7/2020 | Dornemann et al. |
| 2021/0049049 A1 | 2/2021 | Kuik et al. |

OTHER PUBLICATIONS

The PCT Search Report and Written Opinion dated Nov. 2, 2020 for PCT Application No. PCT/US2020/046376, 15 pages.
The International Preliminary Report on Patentability for PCT Application No. PCT/US20/46376, dated Mar. 3, 2022.

* cited by examiner

400 ⟶

```
┌─────────────────────────────────────────────────────────────────┐
│ EXECUTE A VIRTUAL RESOURCE THAT SUPPORTS A CLUSTERED APPLICATION,│
│ THE VIRTUAL RESOURCE BEING INCLUDED IN A GROUP OF VIRTUAL        │
│ RESOURCES THAT RUN ON RESPECTIVE PHYSICAL SERVERS OF A CLUSTER   │
│ OF PHYSICAL SERVERS                                              │
│ 402                                                              │
└─────────────────────────────────────────────────────────────────┘
                                 │
                                 ▼
┌─────────────────────────────────────────────────────────────────┐
│ RECEIVE AN INDICATION OF A DATABASE INSTANCE RUNNING ON A        │
│ PARTICULAR PHYSICAL SERVER OF THE CLUSTER OF PHYSICAL SERVERS    │
│ THAT IS NEAREST THE PHYSICAL SERVER, THE DATABASE INSTANCE BEING │
│ INCLUDED IN A GROUP OF DATABASE INSTANCES THAT MAINTAIN A COMMON │
│ DATASET ON RESPECTIVE PHYSICAL SERVERS OF THE CLUSTER OF         │
│ PHYSICAL SERVERS                                                 │
│ 404                                                              │
└─────────────────────────────────────────────────────────────────┘
                                 │
                                 ▼
┌─────────────────────────────────────────────────────────────────┐
│ SELECT THE DATABASE INSTANCE FROM AMONG THE GROUP OF DATABASE    │
│ INSTANCES BASED AT LEAST IN PART ON THE PARTICULAR PHYSICAL      │
│ SERVER BEING NEAREST THE PHYSICAL SERVER                         │
│ 406                                                              │
└─────────────────────────────────────────────────────────────────┘
                                 │
                                 ▼
┌─────────────────────────────────────────────────────────────────┐
│ CAUSE THE VIRTUAL RESOURCE TO ACCESS THE DATABASE INSTANCE       │
│ 408                                                              │
└─────────────────────────────────────────────────────────────────┘
```

EXECUTE AN APPLICATION CONTAINER ON A PHYSICAL SERVER OF A CLUSTER OF PHYSICAL SERVERS, THE APPLICATION CONTAINER BEING INCLUDED IN A GROUP OF APPLICATION CONTAINERS OF A CLUSTERED APPLICATION EXECUTING ON THE CLUSTER OF PHYSICAL SERVERS
502

RECEIVE, AT THE APPLICATION CONTAINER, AN INDICATION OF A DATABASE INSTANCE RUNNING ON A PARTICULAR PHYSICAL SERVER OF THE CLUSTER OF PHYSICAL SERVERS THAT IS NEAREST THE PHYSICAL SERVER, THE DATABASE INSTANCE BEING INCLUDED IN A GROUP OF DATABASE INSTANCES THAT MAINTAIN A COMMON DATASET ON RESPECTIVE PHYSICAL SERVERS OF THE CLUSTER OF PHYSICAL SERVERS
504

SELECT THE DATABASE INSTANCE FROM AMONG THE GROUP OF DATABASE INSTANCES BASED AT LEAST IN PART ON THE PARTICULAR PHYSICAL SERVER BEING NEAREST THE PHYSICAL SERVER
506

ACCESS, BY THE APPLICATION CONTAINER, THE DATABASE INSTANCE BASED AT LEAST IN PART ON THE PARTICULAR DATABASE INSTANCE BEING ON THE PARTICULAR SERVER THAT IS NEAREST THE PHYSICAL SERVER
508

FIG. 5

OPTIMIZING CLUSTERED APPLICATIONS IN A CLUSTERED INFRASTRUCTURE

RELATED APPLICATIONS

This application claims priority to and is a continuation of U.S. patent application Ser. No. 16/543,250, filed on Aug. 16, 2019, the entire contents of which are incorporated herein by reference.

TECHNICAL FIELD

The present disclosure relates generally to providing a distributed clustered application with information regarding a cluster of physical servers on which the distributed clustered application is running.

BACKGROUND

Cloud computing provides users with access to computing resources to fulfill users' computing resource needs. In some examples, service providers can manage and provide cloud computing resources to users to fulfill their needs without the users having to invest in and maintain their own computing infrastructure. Cloud computing often involves the use of networks of data centers which house servers, routers, and other devices that provide computing resources to users such as compute resources, networking resources, storage resources, database resources, application resources, and so forth. Users may be allocated portions of the computing resources using virtualization technology that remain available for peak demands of the users. The virtualized portions, or virtualized networks, of computing resources may be scaled up (or down) according to the computing needs of a given user without the need to maintain excess computing capacity. For example, an online retailer can scale a virtualized network of computing resources to meet increased demand during the holiday shopping season without having to maintain the underlying physical computing infrastructure used to provide the retailer's online presence.

To support an application using cloud computing, clustering techniques may be utilized to organize multiple physical servers into a cluster (or a group of servers that acts like a single system). Clustered servers may increase the availability and scalability of clustered applications or services. For instance, if one or more nodes (or servers) in the physical underlay cluster fail, other nodes begin to provide the application or service such that the failure does not terminate functionality of the clustered application for a user.

Often, a single physical server may run multiple instances of an application in a clustered application using virtualization techniques, such as multiple virtual machines and/or multiple application containers running the application. The application containers of the clustered application may each have access (e.g., read, write, etc.) to a stable set of replicated data that is maintained across multiple physical servers, such as in database instances. By running database instances that maintain the same data set on different physical servers of the physical underlay cluster, the application containers are provided with redundancy and high availability when accessing the data sets. Accordingly, it may be advantageous to instantiate database instances (or other storage instances) on different physical servers of the physical underlay cluster to maintain the same data set with higher redundancy and availability.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates a flow diagram of an example method for a virtual resource that supports a clustered application to receive information regarding database instance running on a nearest physical server in a cluster of physical servers, and access that database instance.

FIG. 5 illustrates a flow diagram of an example method for an application container that supports a clustered application to receive information regarding database instance running on a nearest physical server in a cluster of physical servers, and access that database instance.

DESCRIPTION OF EXAMPLE EMBODIMENTS

Overview

Figure 1:
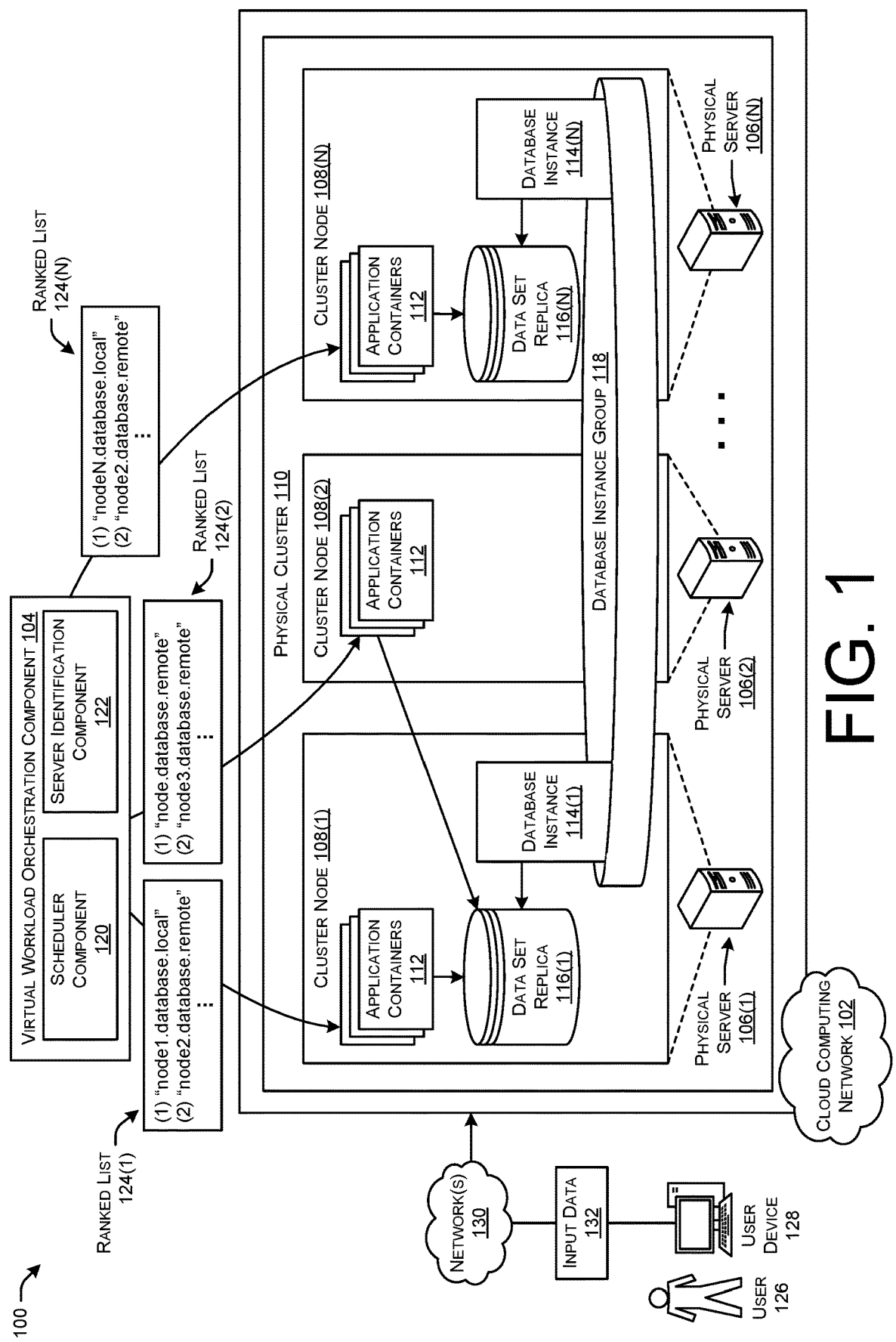
FIG. 1 illustrates a system-architecture diagram of an example environment in which a server identification component provides a distributed clustered application with information regarding a cluster of physical servers on which the distributed clustered application is running.

This disclosure describes techniques for providing virtual resources (e.g., containers, virtual machines, etc.) of a clustered application with information regarding a cluster of physical servers on which the distributed clustered application is running. The method includes executing the virtual resource that supports the clustered application on a physical server of the cluster of physical servers. The method further includes receiving an indication of a database instance running on a particular physical server of the cluster of physical servers that is nearest the physical server. The database instance may be included in a group of database instances that are maintaining a common data set on respective physical servers of the group of physical servers. Further, the method includes causing the virtual resource to access the database instance on the particular physical server based at least in part on the database instance running on the particular server that is nearest the physical server.

Additionally, the techniques described herein may be performed by a system and/or device having non-transitory computer-readable media storing computer-executable instructions that, when executed by one or more processors, performs the method described above.

Example Embodiments

The usefulness of server virtualization, from virtual machines to containers to storage, has resulted in a rapid increase in cloud computing and data centers. Using virtualization technologies, a single physical server can host multiple applications, operating systems, and/or data storage instances using server virtualization (e.g., a software layer called a hypervisor). In this way, multiple applications or processes may execute on a single physical server to drive up overall hardware utilization of that physical server. Some cloud computing systems may utilize application clustering (or software clustering) where multiple physical servers are turned into a cluster of physical servers, or a group of servers, that act like a single system. Each of the servers in the physical cluster maintains the same data set and collectively run or support a same application, referred to herein as a clustered application. For example, virtual machines (VMs) and/or application containers may run processes of an application to provide a distributed clustered application. A distributed clustered application that runs on a cluster of physical servers provide various advantages, such as increased availability, increased scalability, and failover protections.

In clustered applications, multiple applications containers (or other virtual resources) can run on a single server where each application container runs an individual instance of the application or service. Because the application containers are running instances of the same application, the containers generally need access to the same data set that supports or is used by the application. For instance, an online retailer may utilize cloud computing to support a clustered application that includes a plurality of application containers that scale to process orders made using their online site or application. These application containers may need access to a common data set, such as an item catalogue of items offered by the retailer, data used to perform the transactions, etc. Accordingly, the cluster of physical servers may further support a group of database instances that run on the physical servers to maintain a same set of data on the physical servers that is accessible by the application containers. The database instances may be running within containers themselves on multiple physical servers such that they form a cluster themselves, or a database instance group.

Generally, each database instance may have an affinity to bind to a physical server on which the actual persistent data set or volume is stored. The application containers running instances of the clustered application may be provided with a list of the members in the database instance group because they can leverage any database instance on any physical server (or node) in the underlay cluster as the same data set is maintained by each database instance in the group. However, because any database instance may be leveraged by the containers, there may be inefficiencies when the application containers access (e.g., read or write) particular database instances. For example, an application container may be running on a first physical server of the clustered physical servers, and determine to access a data set maintained by database instance running on a second physical server of the clustered physical servers.

However, because the application container is unaware of the infrastructure of the clustered physical servers and where the databases instances are running, the second physical server may be located a relatively large distance away from the first physical server which may result in undesirable latency. For instance, the distance between the first server and second sever may be large and/or require a large number of hops between nodes such that latency in the access made by the application container to the data set is undesirably large. Thus, because the any data set maintained by the various database instances may be leveraged by application containers, and because the application containers are unaware of the locations of the servers on which the database instances are running, the application containers may access data sets that are located on physical servers of the underlay cluster that result in undesirable latency.

This disclosure describes techniques for providing application containers (and/or other virtual resources) of a clustered application with information indicating locations for servers included in a cluster of physical servers on which the distributed clustered application is running. As noted above, clustered applications may access a common data set that is replicated and maintained across the cluster of physical servers by a group database instances that run on the cluster of physical servers. The techniques described herein include providing the application containers with information regarding which database instance is running locally on the same physical server as the application container, or is otherwise located "nearest" the application container. In this way, the application container may target the local or otherwise nearest database instance maintaining the data set to reduce latency with access events made by the application container.

In some examples, a server identification component may identify what containers or other virtual resources are instantiated on the different physical servers of the physical cluster. For instance, the server identification component may be included in or associated with a scheduler/orchestrator for the application containers, database instances, etc. As physical servers, or nodes, are added to the underlay physical cluster, the server identification component may identify the database instances or other container services that are instantiated on each physical node in the physical cluster. As new database instances are instantiated, the server identification component may algorithmically name the instances using a scheme that provides uniquely identifiable DNS entries for each database instance.

In some examples, the server identification component may maintain various physical cluster data, such as server location data indicating locations of the physical servers in the cluster, latency data indicating latency between the different physical servers, resource-availability data indicating how much capacity physical servers have, and/or other data. The server identification component may collect the data periodically or continuously in order to determine where the physical servers are located with respect to each other, as well as total latency for access events between physical servers. The server identification component may store indications of which database instances are running on which physical servers in the physical cluster, and also where containers are instantiated, running, or are going to be instantiated. The server identification component may determine nearest database instances for the containers based on various metrics, such as geographic proximity and/or latency between the respective servers on which the containers and database instances are running.

As new container applications are spun up or instantiated on the physical cluster, the server identification component may convey the name or other indication of the nearest database instance (such as a locally running database instance) to the container applications. The container applications may then store an indication of the nearest database instance, and when the container applications need to access (e.g., read, write, etc.) the replicated data set maintained by the database instances, the container applications may communicate with the nearest database instance.

In some examples, the server identification component may provide the application containers with a ranked list of database instances where the database instances are ranked based on how near they are to the application containers (e.g., location proximity, latency time, etc.). The application containers may access the top ranked, or nearest, database instance indicated on the list. However, if a problem arises with accessing the top ranked database instance in the list (e.g., timeouts, database instance failure, etc.), the application containers may move down through the list of ranked database instances to access the next nearest database instance to the containers. In this way, the amount of time and resources needed to access the database instances by the application containers is reduced, and the performance of the application containers is improved.

Although the techniques described herein are primarily with reference to application containers, the techniques are generally applicable to any virtual computing resource, including virtual machines. Further, while the techniques are described with reference to a distributed database application, the techniques are equally application to any distributed application that is deployed on top of a cluster of physical servers. For instance, the techniques may be equally applicable to a storage instance that provides object storage or other long-term storage and/or larger object storage.

The techniques described herein provide various improvements and efficiencies with respect to distributed clustered applications. For example, the techniques described herein may reduce the amount of time, or latency, for application containers or other virtual resources of the clustered applications to process workloads and/or respond to requests. Further, the amount of network traffic across a cluster of physical servers maybe reduced using the techniques described herein as application containers are access nearest database instances, rather than accessing database instances that may be located on servers that are remote in the physical cluster from the application container.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a server identification component provides a distributed clustered application with information regarding a cluster of physical servers on which the distributed clustered application is running.

In some examples, computing resources of a cloud computing network 102 may be utilized by a virtual workload orchestration component 104 to instantiate, support, run, and/or execute virtual resources (e.g., virtual machines, containers, etc.). The cloud computing network 102 may comprise clusters of managed physical servers 106(1)-106(N) where N is any integer greater than "1." The servers 106 may be in stored in data centers located across geographic areas. The cloud computing network 102 may be a distributed network through which users (often customers) may interact via user devices to manage or otherwise interact with service provided by the cloud computing network 102.

The cloud computing network 102 may provide on-demand availability of computing system resources, such as data storage, computing power (e.g., CPU, GPU, etc.), networking, databases, etc., without direct active management by users. In some examples, the cloud computing network 102 may be managed and maintained by a service provider such that users do not have to invest in and maintain the computing infrastructure for their computing resource needs. Generally, a user may be provided access to, or allocated use of, a portion of the computing resources in the cloud computing network 102. The cloud computing network 102 may scale, such as by spinning up resources or spinning down resources, based on demand for the individual users. The portions of the cloud computing network 102 may be allocated using hardware virtualization such that portions of the cloud computing network 102 can be configured and managed by the user (e.g., security configuration, load balancing configuration, etc.). However, the cloud computing network 102 need not be managed by a service provider, and can be managed by any entity, including the user themselves that run the applications or services.

In some examples, a user of the cloud computing network 102 may request that multiple physical servers 106 in the cloud computing network 102 be grouped into a physical cluster 110 where each server 106 is a cluster node 108. Generally, a physical cluster 110 may refer to a group of servers 106 working together in a system or network to provide users with, among other benefits, higher availability of applications or services. Each node 108 in the physical cluster 110 may run or execute one or more virtual resources, such as application containers 112, virtual machines, etc., that run an application, service, process, or the like. By running application containers 112 on different cluster nodes 108, the physical cluster 110 can reduce downtime and outages by allowing another server 106 to take over in the event of an outage. For instance, if one of these servers 106 experiences a service outage, the workload on that server 106 may be redistributed to another server 106 before any downtime is experienced by the client. In this way, the physical cluster 110 may support applications and services with a higher level of availability, reliability, and scalability than a single server 106 offers.

As noted above, each physical server 106 (or cluster node 108) in the physical cluster 110 may support one or more application containers 112. The application containers 112 may each encapsulate the files, dependencies, libraries, etc., of an application or service to run on an operating system of a physical server 106. In some examples, a single physical serer 106 may run multiple application containers 112 on the same operating system at the same time. In this way, the physical server 106 may run multiple application containers 112 that each run independent instances of the same application. However, in some instances the physical severs 106 may run one or more virtual machines where each virtual machine runs an independent instance of the application, service, or other process. The application containers 112 can generally run or support any service, application, clustered environment, and so forth.

In some examples, the application containers 112 of the clustered application may have access (e.g., read, write, etc.) to one or more data set replicas 116(1)-116(N) that are maintained across multiple physical servers 106, such as by a respective database instance 114 running on the physical server 116 on which the data set replica 116 is stored. The database instances 114 may be included in a database instance group 118 running on the physical cluster 110. For instance, the database instances 114 may be running within containers themselves on multiple physical servers 106 such that they form a cluster themselves, or the database instance group 118.

Generally, each database instance 114 has an affinity to bind to a physical server 106 on which the actual persistent data set replicate 116 or volume is stored. By running database instances 114 that maintain the same data 116 set on different physical servers 106 of the physical cluster 110, the application containers 112 are provided with redundancy and high availability when accessing the data set 116. Accordingly, it may be advantageous to instantiate database instances 114 (or other storage instances) on different physical servers 106 of the physical cluster 110 to maintain data set replicas 116 with higher redundancy and availability.

As noted above, the application containers 112 may generally leverage any of the database instances 114 in the group 118 as they maintain common data set replicas 116. However, there may be inefficiencies when the application containers 112 access (e.g., read or write) particular database instances 114. For example, an application container 112 may be running on a first physical server 106(1) of the physical cluster 110, and determine to access a data set replica 116(N) maintained by database instance 114(1) running on a second physical server 106(N) of the physical cluster 110. However, the second physical server 106(N) may be located a relatively large distance away from the first physical server 106(1) in the physical cluster 110, which may result in undesirable latency.

The techniques described herein include collecting various data, such as infrastructure data and location data for the physical cluster 110, indicating on which physical servers 106 the application containers 112 and database instances 114 are running. In some examples, the virtual workload orchestration component 104 may be an orchestration platform for application containers 112 that manages containerized applications in a clustered environment. The virtual workload orchestration component 104 may perform or manage tasks such as container 112 deployment, scaling, configuration, versioning, rolling updates, etc. The virtual workload orchestration component 104 may include a scheduler component 120 that manages clustered applications by deploying the application containers 112 to the cluster nodes 108. Generally, the scheduler component 120 attempts to match application containers 112 and/or database instances 114 to suitable sets of resources on cluster nodes 108 according to techniques known in the art.

The virtual workload orchestration component 104 may include a server identification component 112 that determines on which physical server 106 the application containers 112 and database instances 114 are running. For instance, the server identification component 122 may identify the application containers 112, database instances 114, and/or other container services that are to be instantiated on each cluster node 108 in the physical cluster 110. As new database instances 114 are instantiated, the server identification component 122 may algorithmically name the database instances 114 using a scheme that provides uniquely identifiable DNS entries for each database instance 114. The server identification component 122 may uniquely name the database instances 114 such that the application containers 112 may perform a DNS lookup to identify where the database instances 114 are located.

In some examples, the server identification component 122 may maintain various data for the physical cluster 110, such as server location data indicating locations of the physical servers 106 in the physical cluster 110, latency data indicating latency between the different physical servers 106, resource-availability data indicating how much capacity physical servers 106 have, and/or other data. The server identification component 122 may collect the data periodically or continuously in order to determine where the physical servers 106 are located with respect to each other, as well as total latency for access events between physical servers 106. The server identification component 122 may store indications of which database instances 114 are running on which physical servers 106 in the physical cluster 110, and also where application containers 112 are instantiated, running, or are going to be instantiated. The server identification component 122 may determine nearest database instance(s) 114 for the application containers 112 based on various metrics, such as geographic proximity and/or latency between the respective physical servers 106 on which the application containers 112 and database instances 114 are running.

As new container applications 112 are spun up or instantiated on the physical cluster 110, the server identification component 122 may convey the name or other indication of the nearest database instance 114 (such as a locally running database instance) to the container applications 112. Additionally, or alternatively, the server identification component 122 may continuously or periodically send update indications of the nearest database instance 114 to the container applications 112. The container applications 112 may then store an indication of the nearest database instance 114, and when the container applications 112 need to access (e.g., read, write, etc.) a data set replica 116 maintained by the database instances 114, the container applications 112 may communicate with the nearest database instance 114.

In some examples, the server identification component 122 may provide the application containers 112 with a ranked list 124 of database instances 114 where the database instances 114 are ranked based on how near they are to the application containers 112 to which the lists 124 are provided (e.g., location proximity, latency time, etc.). The application containers 112 may access the top ranked, or nearest, database instance 112 indicated on the ranked list 124. However, if a problem arises with accessing the top ranked database instance 114 in the ranked list 124 (e.g., timeouts, database instance failure, etc.), the application containers 112 may move down the ranked list 124 through the ranked database instances 114 to access the next nearest database instance 114 to the application containers 112. In this way, the amount of time and resources needed to access the database instances 114 by the application containers 112 is reduced, and the performance of the application containers 112 is improved.

Figure 2:
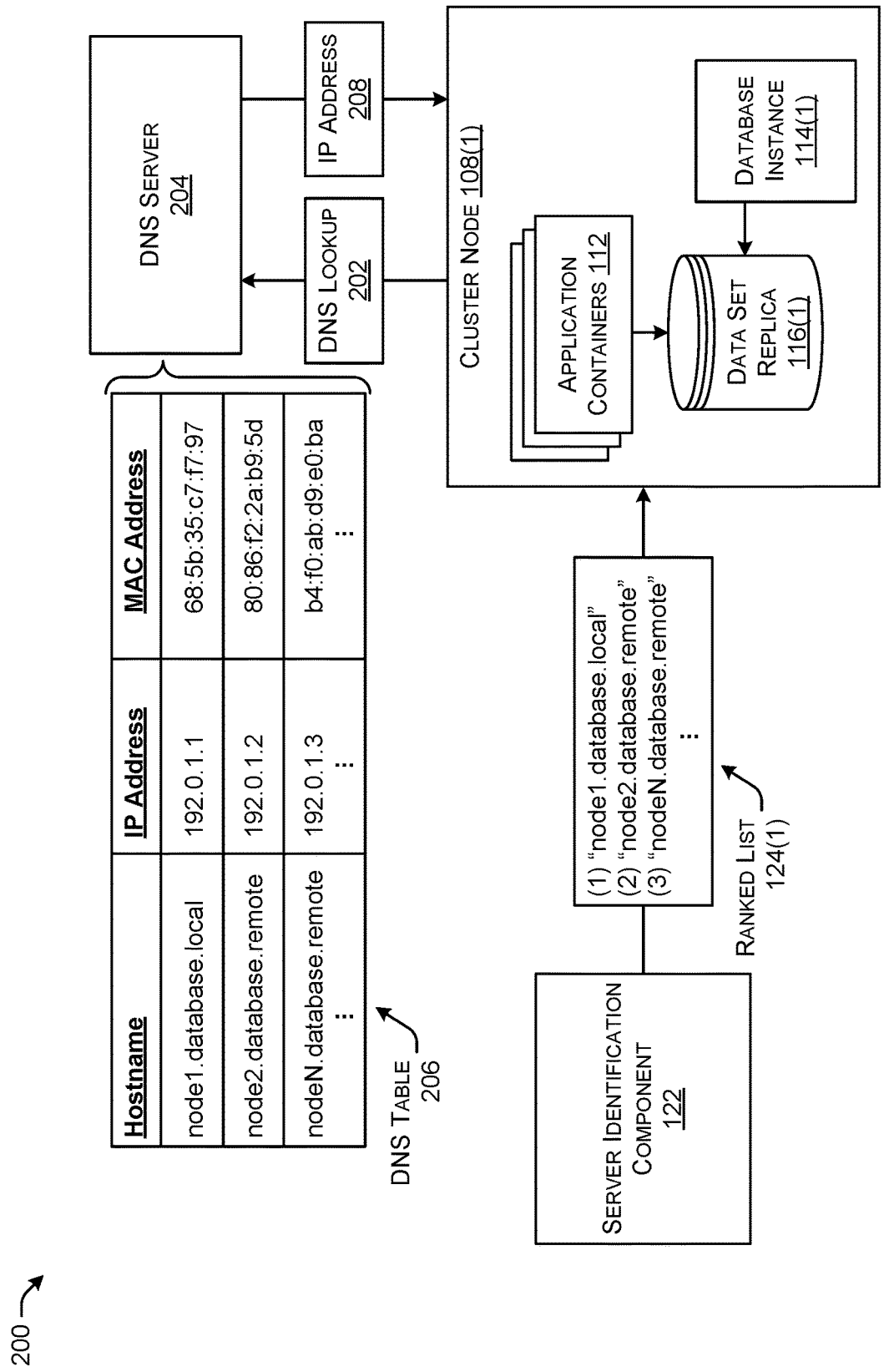
FIG. 2 illustrates a component diagram of an example flow for an application container on a cluster node performing a DNS lookup to identify a physical server on which a nearest database instance is running.

As described in more detail in FIG. 2, the application containers 112 may perform a DNS lookup to identify the location of the nearest database instance 114 based on the name of the database instance 114 provided in the ranked list 124. However, in some examples the application containers 112 may only be provided with an indication or name of only the nearest database instance 114 as opposed to the ranked list 124.

As illustrated, the application containers 112 running on cluster node 108(1) may have received an indication that database instance 114(1) is running locally on the cluster node 108(1), and that the database instance 114(1) is the nearest instance maintaining the data set replica 116(1). Accordingly, the application containers 112 running on cluster node 108(1) may access the data set replica 116(1)

maintained by the database instance 114(1). As further illustrated, the application containers 112 running on cluster node 108(2) may receive an indication that the nearest database instance 114(1) is running on cluster node 108(1), and access the data set replica 116(1) that is maintained by the database instance 114(1). Further, in some examples, if the nearest database instance 114 fails, the application containers 112 may begin accessing the next highest ranked database instance 114 in the ranked list 124 provided by the virtual workload orchestration component 104.

In some examples, the virtual workload orchestration component 104 may place a cap on the number of database instances 114 such that the number of members in the database instance group 118 is less than the size (or number of members) of the physical cluster 110. This cap may be beneficial or desirable when there are a large number of physical servers 106 in the underlay physical cluster 110. As another example, the virtual workload orchestration component 104 may desire to restrict the database instance 114 to physical node members and avoid virtual machine (VM)-based node members.

In some examples, the number of application containers 112 may scale based on a number of users 126 interacting with the clustered application. The users 126 may comprise one or more of individual users, groups of users, organizations, businesses, or other entities that interact with the cloud computing network 102 via respective user devices 128. The user devices 128 may be any type of computing device capable of connecting to the cloud computing network 102 via a suitable data communications network 130 such as, but not limited to, a laptop or desktop computer, a tablet computing device, a server computer, a television, or a mobile telephone. Administrative users employed by the operator of the cloud computing network 102, such as administrators managing the operation of the cloud computing network 102, might also connect with, manage, and utilize resources provided by the service provider network 102 in a similar fashion.

The users 126 may provide input data 132 via the network(s) 130 to interact with the clustered application that is supported by the application containers 112 running on the physical cluster 110. For example, the users 126 may submit requests to process data, retrieve data, store data, and so forth such that application containers 112 are spun up or spun down to process the requests based on demand.

In some instances, the server identification component 122 may not be included in the virtual workload orchestration component 104. Instead, the server identification component 122 could be in another service or component depending on the architecture of the cloud computing network 102 and associated components. In further examples, the server identification component 122 may be included in the scheduler component 120. Generally, the logic of the server identification component 122 may be located in different locations, associated with different entities, run on different servers, comprise logic across multiple servers, and/or any other arrangement depending on the architecture utilized.

FIG. 2 illustrates a component diagram 200 of an example flow for an application container 112 on a cluster node 108 performing a DNS lookup to identify a physical server 106 on which a nearest database instance 114 is running. As shown, the server identification component 122 may provide a ranked list 124(1) of names of database instances 114 to the application containers 112 running on the cluster node 108(1). The application containers 112 may store the ranked list 124(1) of database instances 114 locally at the cluster node 108(1).

In some examples, the names of the database instances 114 in the ranked list may indicate on which cluster nodes 108 the respective database instances 114 are running. For instance, the name indicating the database instances 114 may also indicate a name of the associated cluster node 108. Further, the names may further indicate whether or not the database instance 114 is on the local cluster node 108 (e.g., the application containers 108 and database instances 114 are running on the same cluster node 108), or a remote cluster node 108.

To determine an address for the cluster node 108 on which the nearest database instance 114 is executing, the application containers 112 may perform a DNS lookup 202 with a DNS server 204. For instance, the application containers 112 may forward or provide the name (e.g., domain name) of the nearest database instance 114 to the DNS server 204 in a DNS lookup request 202. The DNS server may then find an entry in a DNS table 206 that corresponds to name of the nearest database instance 114. The address may comprise an IP address, a MAC address, and/or any other type of address by which the nearest database instance 114 may be located. The DNS server 204 may identify the corresponding address and return the address to the application containers 112 on the cluster node 108(1). The application containers 112 may then access the database instance 114(1) using the address provided from the DNS server 204. In some instances, the nearest database instance 114 is a local database instance 114(1) running on the same cluster node 108(1) as the application containers 112. However, in some examples the nearest database instance 114 may be located on another cluster node 108 in the physical cluster 110 that is nearest the application containers 112 on the cluster node 108(1) (e.g., lowest latency, closest geographic proximity, etc.).

Figure 3:
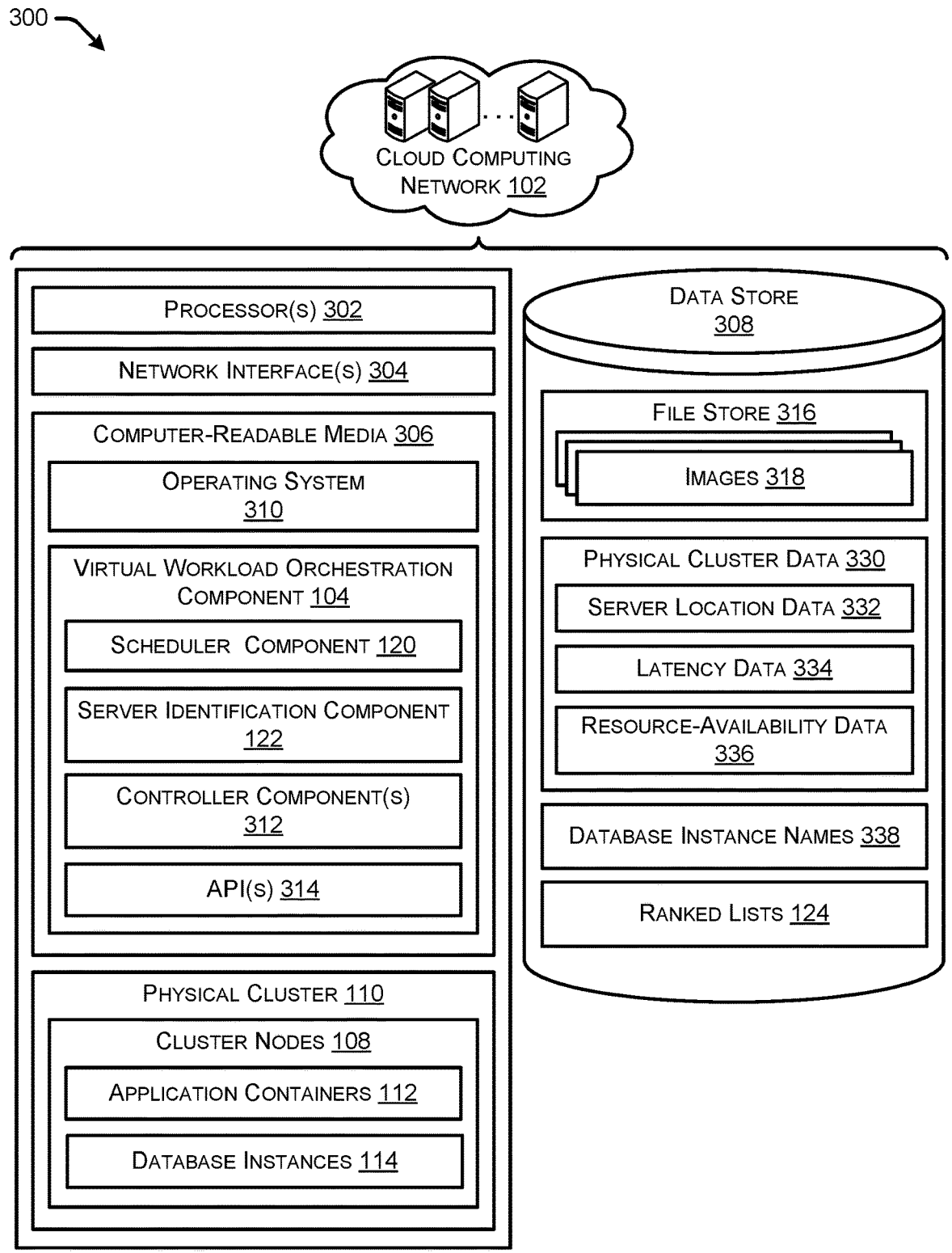
FIG. 3 illustrates a component diagram illustrating example components of a cloud computing network.

FIG. 3 illustrates a component diagram 300 of example components of a cloud computing network 102. As illustrated, the service provider network 102 may include one or more hardware processors 302 (processors) configured to execute one or more stored instructions. The processor(s) 302 may comprise one or more cores. Further, the cloud computing network 102 may include one or more network interfaces 304 configured to provide communications between the cloud computing network 102 and other devices, such as the user device(s) 128, and communications between devices in the cloud computing network 102 (e.g., cluster nodes 108, load balancers, routers, etc.). The network interfaces 304 may include devices configured to couple to personal area networks (PANs), wired and wireless local area networks (LANs), wired and wireless wide area networks (WANs), and so forth. For example, the network interfaces 304 may include devices compatible with Ethernet, Wi-Fi™, and so forth.

The cloud computing network 102 may include computer-readable media 306 that stores one or more operating systems 310. The operating system(s) 310 may generally support basic functions of the devices in the cloud computing network 102, such as scheduling tasks on the devices, executing applications on the devices, controlling peripheral devices, and so forth. The computer-readable media 306 may further store the virtual workload orchestration component 104 that is configured to, when executed by the processor(s) 302, perform at least the functions described herein. In addition to the scheduler component 120 and the server identification component 122, the virtual workload orchestration component 104 may further store one or more controller components 312 and one or more APIs 314.

The controller components 312 may execute routine tasks to ensure the desired state of the database instances 114 and/or application containers 112 match the observed state. For instance, the controller components 312 may determine that the correct number of application containers 112 and/or database instances 114 are running for their respective cluster or group. The controller components 312 may identify the state of the physical servers 106 and respond when a server 106 goes down, as an example. In some examples, the controller components 312 may identify the state of the physical servers are to respond, such as when components within the server 106 render the server 106 "down," a virtual machine instance fails, and/or any other event may occur to which the controller components 312 are to respond. The APIs 314 may generally server as a foundation for a declarative configuration scheme for the virtual workload orchestration component 104.

The cloud computing network 102 may further include the physical cluster 110 described above, which in turn includes the cluster nodes 108 on which the application containers 112 and database instances 114 are executing. For instance, each cluster node 108 may include one or more processors 302 configured to execute the application containers 112 (and/or virtual machines) and database instances 114 (and/or other storage instances) described herein.

The cloud computing network 102 may include a data store 308 that is stored on a device of the cloud computing network 102, or across multiple devices of the cloud computing network 102. The data store may include a file store 316 that includes one or more images may comprise static files that include executable code to run an isolated process, such as an application container 112 image, virtual machine image, database instance 114 image, etc. The images 318 may comprise system libraries, system tools, and other platform settings a software program needs to run on a virtualized platform.

The data store 308 may further store physical cluster data 330, such as server location data 332, latency data 334, and resource-availability data 336. The server location data 332 may comprise various types of data indicating locations of the cluster nodes 108. For instance, the server location data 332 may indicate geographic locations of the cluster nodes 108, physical distances between the cluster nodes 108, network communication distances between the cluster nodes, etc. The latency data 334 may indicate latency between the cluster nodes 108. For instance, the latency data 108 may indicate latency between the cluster nodes 108 such that a total latency may be determined between any two nodes in a physical cluster 110. The resource-availability data 336 may indicate amounts of different types of computing resources (e.g., compute, storage, database, network, etc.) available on each of the cluster nodes 108. In some instances, the resource-availability data 336 may be taken into account when determining which database instance 114 that an application container 112 is to access. For instance, if two database instances 114 are in close proximity to an application container 112, the database instance 114 with more resource availability may be accessed by the application container 112.

The server identification component 122 may utilize one or more of the server location data 332, latency data 334, and/or resource-availability data 336 to determine the ranked list 124 of database instances 114 as described herein (e.g., rank based on lowest latency, ranked based on nearest location, take into account resource availability among multiple near instances, etc.). Further the data store 308 may store database instance names 338 that are determined for the different database instances 114 based on the physical servers 106 on which the database instances 114 are running.

Figure 6:
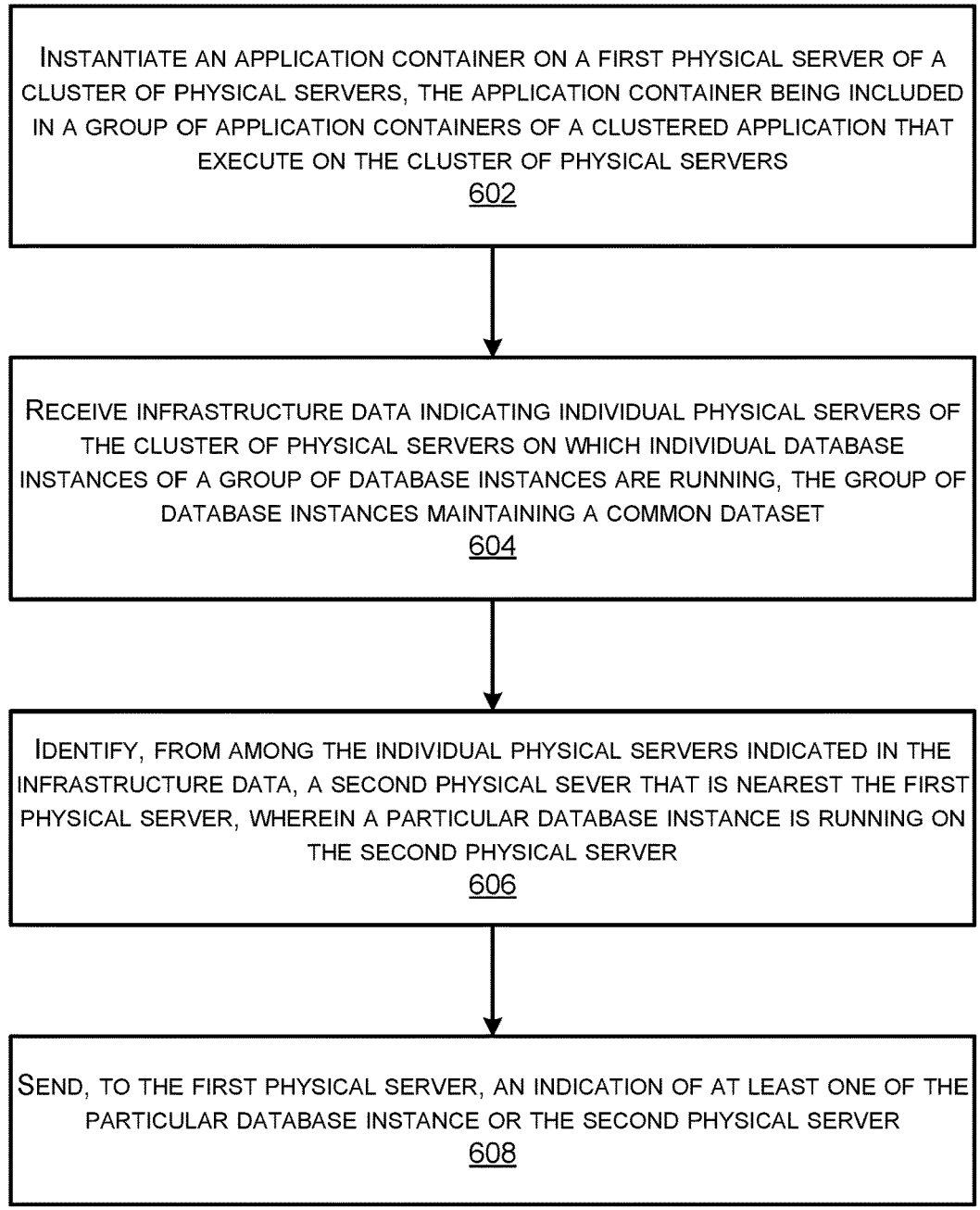
FIG. 6 illustrates a flow diagram of an example method for providing an application container that supports a clustered application with information regarding a cluster of physical servers on which the clustered application is running.

FIGS. 4, 5, and 6 illustrate flow diagrams of example methods 400, 500, and 600 that illustrate aspects of the functions performed at least partly by the cloud computing network 102 as described in FIGS. 1-3. The logical operations described herein with respect to FIGS. 4, 5, and 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4, 5, and 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 illustrates a flow diagram of an example method 400 for a virtual resource (e.g., application container 112, virtual machine, etc.) that supports a clustered application to receive information regarding database instance 114 running on a nearest physical server 106 in a cluster of physical servers, and access that database instance 114. The virtual resource may be executing on one or more processors of a physical server 106 that is included in a physical cluster 110. One the physical server 106 may comprise the one or more processors and one or more non-transitory computer-readable media storing computer-executable instructions (e.g., application container 112) that, when executed by the one or more processors, cause the one or more processors to perform the method 400.

At 402, the physical server 106 may execute a virtual resource (e.g., application container 112, virtual machine, etc.) that supports the clustered application. The virtual resource may be included in a group of virtual resources that run on respective physical servers 106 of the cluster of physical servers (e.g., physical cluster 110) and support the clustered application. The virtual resource may be executed after instantiation, or may be executing during normal execution of the application or service.

At 404, the physical server 106 may receive an indication of a database instance 114 running on a particular physical server 105 of the cluster of physical servers 110 that is nearest the physical server 106. The database instance 114 may be included in a group of database instances (e.g., database instance group 118) that maintain a common data set (e.g., data set replicas 116) on respective physical servers 106 of the cluster of physical servers 110.

At 406, the physical server 106 may select the database instance 114 from among the group of database instances 118 based at least in part on the particular physical server 106 being nearest the physical server 106. In some examples, the particular physical server 106 on which the database instance 114 is running may be the same as the physical server 106 on which the virtual resource is running (e.g., local). In some examples, the particular physical server 106 is different than the physical server 106, and the particular physical server 106 on which the database instance 114 is running is nearest the physical server 106 of the virtual resource such that, at least one of the virtual resource accesses the database instance 114 with the least amount of network latency from among the group of databases instances 118, or the physical server 106 is located nearest the particular physical server 106 from among the cluster of physical servers 110.

At 408, the physical server 106 may cause the virtual resource to access the database instance 114 (e.g., to read and/or write data from the data set replica 116).

In some instances, the method 400 performed by the physical server 106 may further include receiving a ranked list 124 of the database instances 114 where the database instances 114 are ranked based at least in part on how near the physical server 106 is to the respective physical servers 106 on which the database instances 114 are instantiated. In examples, if the physical server 106 determines that the database instance 114 running on the particular physical server 106 is unavailable for access by the virtual resource (e.g., failure), the physical server 106 may identify, from the ranked list 124, a secondary database instance 114 that is accessible by the virtual resource, and cause the virtual resource to access the secondary database instance 114.

FIG. 5 illustrates a flow diagram of an example method 500 for an application container 112 that supports a clustered application to receive information regarding database instance 114 running on a nearest physical server 106 in a cluster of physical servers 110, and access that database instance 114.

At 502, the application container 112 may execute on a physical server 106 of a cluster of physical servers 110. In some examples, the application container 112 is included in a group of application containers 112 of a clustered application executing on the cluster of physical servers 106.

At 504, the application container 112 may receive an indication (e.g., domain name) of a database instance 114 running on a particular physical server 106 of the cluster of physical servers 110 that is nearest the physical server 106. The database instance 114 may be included in a group of database instances 118 that maintain a common data set 116 on respective physical servers 106 of the cluster of physical servers 110.

At 506, the application container 112 may select the database instance 114 from among the group of database instances 118 based at least in part on the particular physical server 106 being nearest the physical server 106. For instance, the application container 112 may identify the database instance 114 as being the nearest database instance 114 from the ranked list 124 (or an indication of a single, nearest instance 114).

At 508, the application container 112 may access the database instance 114 based at least in part on the particular database instance 114 being on the particular server 106 that is nearest the physical server 106. For instance, the application container 112 may read from, write to, or otherwise access the data set replica 116 that is maintained by the database instance 114 determined to be nearest the application container 112.

FIG. 6 illustrates a flow diagram of an example method 600 for providing an application container 112 that supports a clustered application with information regarding a cluster of physical servers 110 on which the clustered application is running. In some examples the method 600 may be performed by a system that includes one or more processors and one or more non-transitory computer-readable media storing computer-executable instructions that, when executed by the one or more processors, cause the one or more processors to perform various operations. The system performing method 600 may be on a single device, or on multiple devices having at least one respective processor each. In some examples, the system may correspond to or include one or more components of the virtual workload orchestration component 104.

At 602, the system may instantiate an application container 112 on a first physical server 106 of a cluster of physical servers 110. In examples, the application container 112 is included in a group of application containers of a clustered application that execute on the cluster of physical servers 110.

At 604, the system may receive infrastructure data (e.g., physical cluster data 330) indicating individual physical servers 106 of the cluster of physical servers 110 on which individual database instances 114 of a group of database instances 118 are running. The group of database instances 114 may be maintaining a common dataset (e.g., data set replica 116).

At 606, the system may identify, from among the individual physical servers 106 indicated in the infrastructure data, a second physical sever 106 that is nearest the first physical server 106. A particular database instance 114 may be indicated as running on the second physical server 106 based on stored indications of servers 106 on which containers 112 and instances 114 are running.

At 608, the system may send, to the first physical server 106, an indication of at least one of the particular database instance 114 or the second physical server 106. For example, the system may send a notification to an application container 112 (or the first physical server 106 on which the application container 112 is running) indicating a name of the particular database instance 114, and/or simply the second physical 106 on which the particular database instance 114 is running.

In some examples, the system may further determine (using latency data 334) network latencies between the first physical server 106 and the individual physical servers 106 of the cluster of physical servers 110 on which individual database instances 114 are running. The system may then determine that a network latency between the first physical server 106 and the second physical server 106 is the lowest of the network latencies. In examples, the second physical server 106 is identified as being nearest to the first physical server 106 based at least in part on the network latency being the lowest of the network latencies.

In examples, the system may further determine, using the infrastructure data, locations of the individual physical servers 106 of the cluster of physical servers 110 on which individual database instances 114 are running. The system may further determine, from the locations, that a first location of the first physical server 106 is nearest a second location of the second physical server 106 from among the locations of the individual physical servers 106. In examples, the second physical server 106 is identified as being nearest to the first physical server 106 based at least in part on the first location being nearest the second location.

Figure 7:
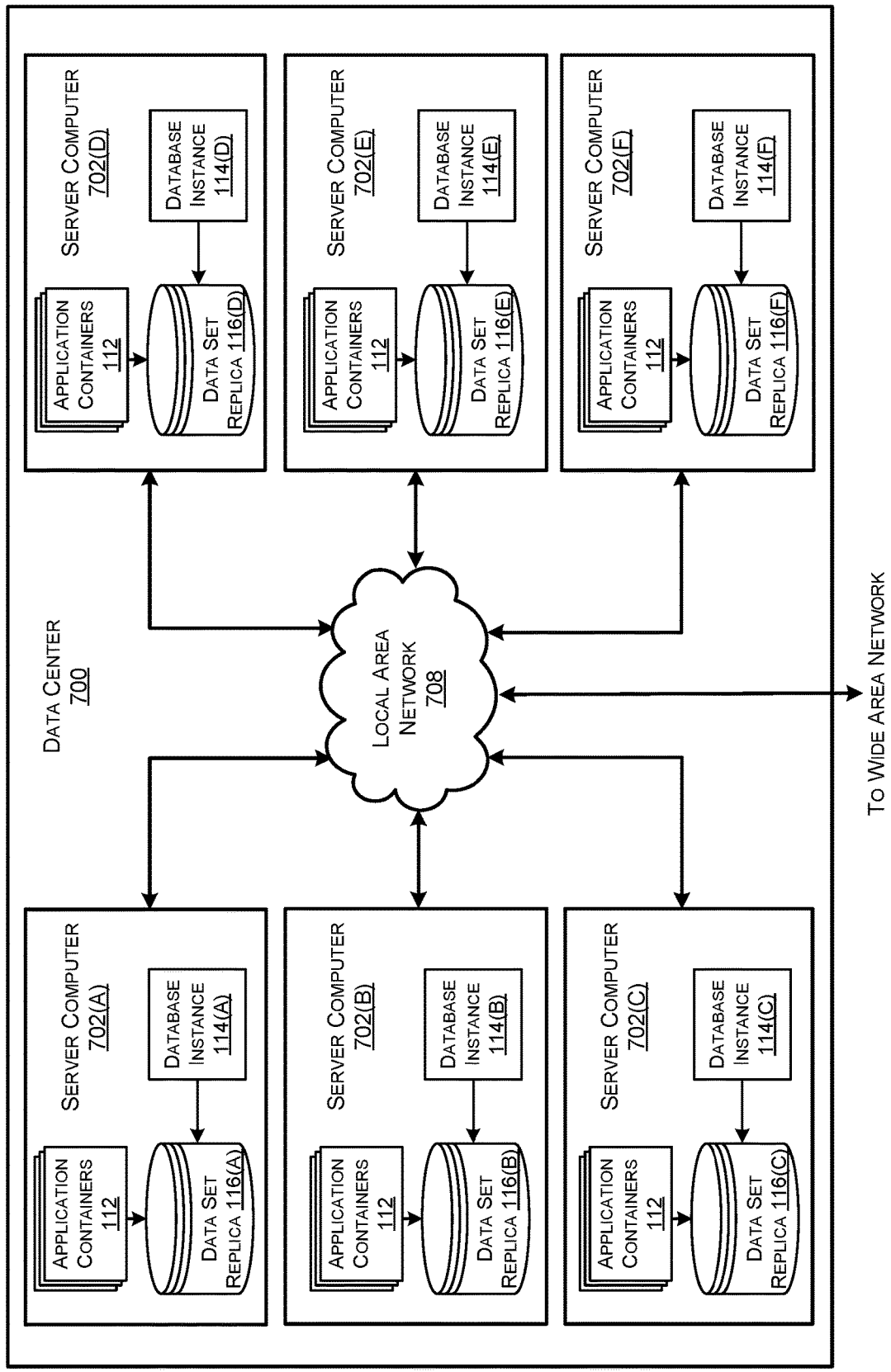
FIG. 7 illustrates a computing system diagram illustrating a configuration for a data center that can be utilized to implement aspects of the technologies disclosed herein.

FIG. 7 is a computing system diagram illustrating a configuration for a data center 700 that can be utilized to implement aspects of the technologies disclosed herein. The example data center 700 shown in FIG. 7 includes several server computers 702A-702F (which might be referred to herein singularly as "a server computer 702" or in the plural as "the server computers 702") for providing computing resources. In some examples, the resources and/or server computers 702 may include, or correspond to, the physical servers 106 described herein.

The server computers 702 can be standard tower, rackmount, or blade server computers configured appropriately for providing the computing resources described herein. As mentioned above, the computing resources provided by the cloud computing network 102 can be data processing resources such as VM instances or hardware computing systems, database clusters, computing clusters, storage clusters, data storage resources, database resources, networking resources, and others. Some of the servers 702 can also be configured to execute a resource manager capable of instantiating and/or managing the computing resources. In the case of VM instances, for example, the resource manager can be a hypervisor or another type of program configured to enable the execution of multiple VM instances on a single server computer 702. Server computers 702 in the data center 700 can also be configured to provide network services and other types of services.

In the example data center 700 shown in FIG. 7, an appropriate LAN 708 is also utilized to interconnect the server computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the server computers 702A-702F in each data center 700, and, potentially, between computing resources in each of the server computers 702. It should be appreciated that the configuration of the data center 700 described with reference to FIG. 7 is merely illustrative and that other implementations can be utilized.

As illustrated in FIG. 7, the server computers 702 may each execute one or more application containers 112 that access data set replicas 116 managed and maintained by database instances 114. Generally, the server computers 702 may run application containers 112 designated to support a single clustered application, or for multiple clustered applications.

In some instances, the cloud computing network 102 may provide computing resources, like application containers 112, VM instances, and storage, on a permanent or an as-needed basis. Among other types of functionality, the computing resources provided by the cloud computing network 102 may be utilized to implement the various services described above. The computing resources provided by the cloud computing network 102 can include various types of computing resources, such as data processing resources like application containers 112 and VM instances, data storage resources, networking resources, data communication resources, network services, and the like.

Each type of computing resource provided by the cloud computing network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network 102 can also be configured to provide other types of computing resources not mentioned specifically herein.

The computing resources provided by the cloud computing network 102 may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations. One illustrative embodiment for a data center 700 that can be utilized to implement the technologies disclosed herein will be described below with regard to FIG. 7.

Figure 8:
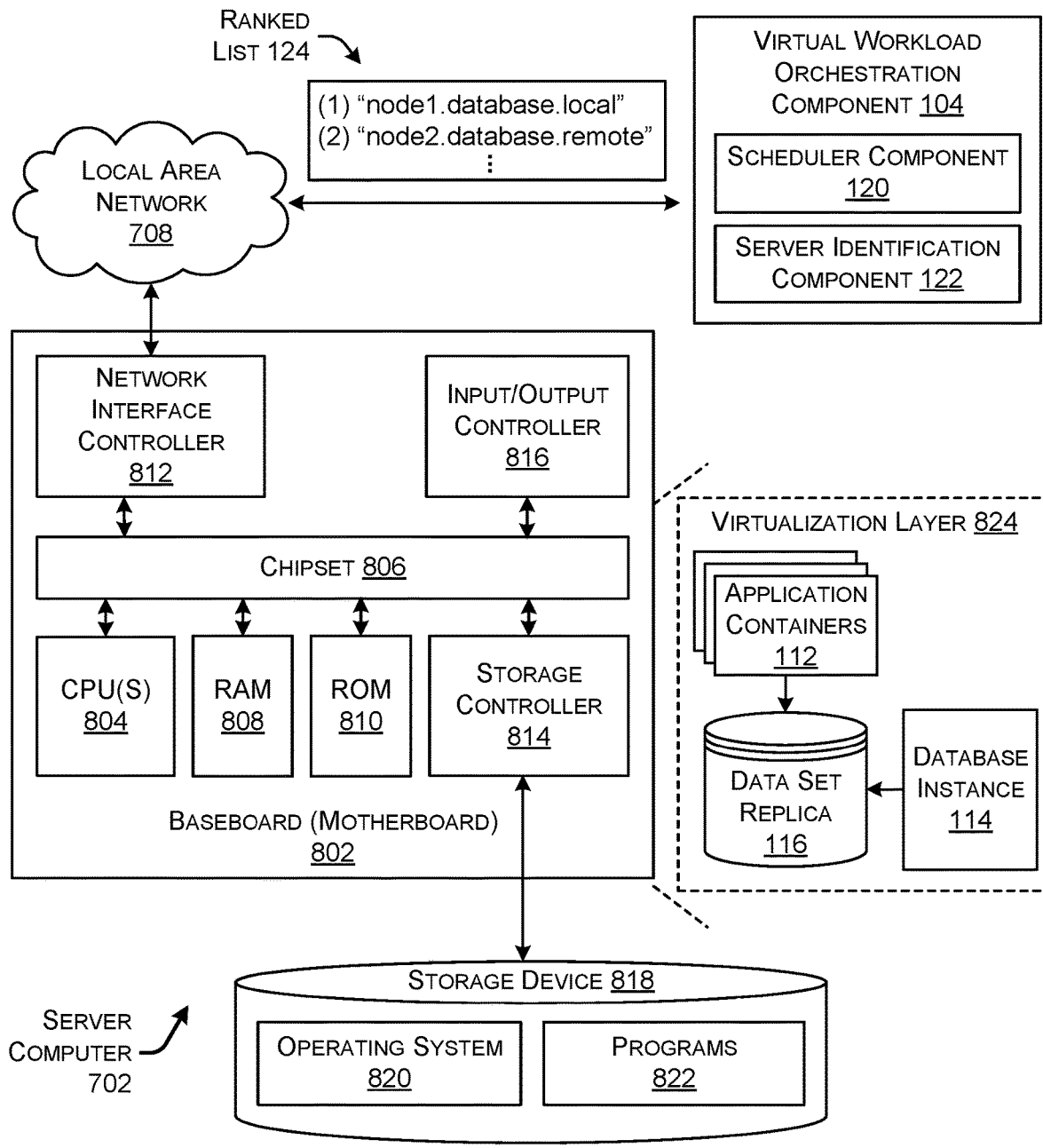
FIG. 8 is a computer architecture diagram showing an illustrative computer hardware architecture for implementing a server device that can be utilized to implement aspects of the various technologies presented herein.

FIG. 8 shows an example computer architecture for a server computer 702 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein. The server computer 702 may, in some examples, correspond to a physical server 106 described herein.

The computer 702 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 702.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 702. The chipset 806 can further provide an interface to a computer-readable storage medium such as a read-only memory ("ROM") 810 or non-volatile RAM ("NVRAM") for storing basic routines that help to startup the computer 702 and to transfer information between the various components and devices. The ROM 810 or NVRAM can also store other software components necessary for the operation of the computer 702 in accordance with the configurations described herein.

The computer 702 can operate in a networked environment using logical connections to remote computing devices and computer systems through a network, such as the network 708. The chipset 806 can include functionality for providing network connectivity through a NIC 812, such as a gigabit Ethernet adapter. The NIC 812 is capable of connecting the computer 702 to other computing devices over the network 708 (or 130). It should be appreciated that multiple NICs 812 can be present in the computer 702, connecting the computer to other types of networks and remote computer systems.

The computer 702 can be connected to a storage device 818 that provides non-volatile storage for the computer. The storage device 818 can store an operating system 820, programs 822, and data, which have been described in greater detail herein. The storage device 818 can be connected to the computer 702 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 702 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 702 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 702 can further read information from the storage device 818 by detecting the physical states or characteristics of one or more particular locations within the physical storage units.

In addition to the mass storage device 818 described above, the computer 702 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 702. In some examples, the operations performed by the cloud computing network 102, and or any components included therein, may be supported by one or more devices similar to computer 702. Stated otherwise, some or all of the operations performed by the cloud computing network 102, and or any components included therein, may be performed by one or more computer devices 702 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 702. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 818 can store other system or application programs and data utilized by the computer 702.

In one embodiment, the storage device 818 or other computer-readable storage media is encoded with computer-executable instructions which, when loaded into the computer 702, transform the computer from a general-purpose computing system into a special-purpose computer capable of implementing the embodiments described herein. These computer-executable instructions transform the computer 702 by specifying how the CPUs 804 transition between states, as described above. According to one embodiment, the computer 702 has access to computer-readable storage media storing computer-executable instructions which, when executed by the computer 702, perform the various processes described above with regard to FIGS. 1-6. The computer 702 can also include computer-readable storage media having instructions stored thereupon for performing any of the other computer-implemented operations described herein.

The computer 702 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 702 might not include all of the components shown in FIG. 8, can include other components that are not explicitly shown in FIG. 8, or might utilize an architecture completely different than that shown in FIG. 8.

The server computer 702 may support a virtualization layer 824, such as one or more application containers 112 executing in the operating system 802. In some examples, the virtualization layer 824 may be supported by a hypervisor that provides one or more virtual machines running on the server computer 702 to perform functions described herein. The virtualization layer 824 may generally support a virtual resource that performs at least portions of the techniques described herein. For instance, as illustrated the application containers 112 may receive a ranked list 124 of database instances 114 from the virtual workload orchestration component 104. The application containers 112 may then access the nearest database instance 114, which may be a local database instance 114 that maintains a data set replica 116 on the server computer 702.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A physical server disposed in a cluster of physical servers that execute a clustered application, the physical server comprising:
   one or more processors; and
   one or more non-transitory computer-readable media storing computer-executable instructions that, when executed by the one or more processors, cause the one or more processors to:
   execute a virtual resource that supports the clustered application, the virtual resource being included in a group of virtual resources that run on respective physical servers of the cluster of physical servers;
   receive an indication of a service instance running on a particular physical server of the cluster of physical servers that is nearest the physical server, the service instance being included in a group of service instances that perform a common action and are hosted on respective physical servers of the cluster of physical servers;
   select the service instance from among the group of service instances based at least in part on the particular physical server being nearest the physical server; and
   cause the virtual resource to access the service instance.

2. The physical server of claim 1, wherein the virtual resource comprises a virtual machine.

3. The physical server of claim 1, wherein the virtual resource comprises an application container.

4. The physical server of claim 1, wherein the particular physical server on which the service instance is running is the same as the physical server on which the virtual resource is running.

5. The physical server of claim 1, wherein:
   the particular physical server is different than the physical server; and
   the particular physical server on which the service instance is running is nearest the physical server of the virtual resource such that, at least one of:
   the virtual resource accesses the service instance with the least amount of network latency from among the group of services instances; or
   the physical server is located nearest the particular physical server from among the cluster of physical servers.

6. The physical server of claim 1, comprising further computer-executable instructions that, when executed by the one or more processors, cause the one or more processors to receive a ranked list of the service instances, wherein the service instances in the ranked list are ranked based at least in part on how near the physical server is to the respective physical servers on which the service instances are instantiated.

7. The physical server of claim 6, comprising further computer-executable instructions that, when executed by the one or more processors, cause the one or more processors to:
   determine that the service instance running on the particular physical server is unavailable for access by the virtual resource;
   identify, from the ranked list of the service instances, a secondary service instance that is accessible by the virtual resource; and
   cause the virtual resource to access the secondary service instance.

8. The physical server of claim 1, wherein the indication of the of the service instance comprises a domain name associated with the service instance, comprising further computer-executable instructions that, when executed by the one or more processors, cause the one or more processors to:
   performing a domain name system (DNS) lookup to identify an internet protocol (IP) address associated with the particular physical server,
   wherein receiving the indication of the service instance comprises identifying, based at least in part on the DNS lookup, the indication that the particular physical server is nearest the physical server.

9. A method comprising:
   executing an application container on a physical server of a cluster of physical servers, the application container being included in a group of application containers of a clustered application executing on the cluster of physical servers;
   receiving, at the application container, an indication of a service instance running on a particular physical server of the cluster of physical servers that is nearest the physical server, the service instance being included in a group of service instances that perform a common action and are hosted on respective physical servers of the cluster of physical servers;
   selecting the service instance from among the group of service instances based at least in part on the particular physical server being nearest the physical server; and
   accessing, by the application container, the service instance based at least in part on the service instance being on the particular server that is nearest the physical server.

10. The method of claim 9, wherein the particular physical server on which the service instance is running is the same as the physical server on which the application container is running.

11. The method of claim 9, wherein:
    the particular physical server is different than the physical server; and
    the particular physical server on which the service instance is running is nearest the physical server of the application container such that, at least one of:
    the application container accesses the service instance with the least amount of network latency from among the group of services instances; or
    the physical server is located nearest the particular physical server from among the cluster of physical servers.

12. The method of claim 9, further comprising receiving, at the application container, a ranked list of the service instances that are ranked based at least in part on how near the physical server of the application container is to the respective physical servers on which the service instances are instantiated.

13. The method of claim 12, further comprising:
    determining that the service instance running on the particular physical server is unavailable for access by the application container;

identifying, from the ranked list of the service instances, a secondary service instance that is accessible by the application container; and accessing, by the application container, the secondary service instance.

14. The method of claim 9, wherein the indication of the of the service instance comprises a domain name associated with the service instance, further comprising:

performing a domain name system (DNS) lookup to identify an internet protocol (IP) address associated with the particular physical server, wherein receiving the indication of the service instance comprises identifying, based at least in part on the DNS lookup, the indication that the particular physical server is nearest the physical server.

15. A system comprising:

one or more processors; and one or more non-transitory computer-readable media storing computer-executable instructions that, when executed by the one or more processors, cause the one or more processors to:

instantiate an application container on a first physical server of a cluster of physical servers, the application container being included in a group of application containers of a clustered application that execute on the cluster of physical servers;

receive infrastructure data indicating individual physical servers of the cluster of physical servers on which individual service instances of a group of service instances are running, the group of service instances performing a common action;

identify, from among the individual physical servers indicated in the infrastructure data, a second physical server that is nearest the first physical server, wherein a particular service instance is running on the second physical server; and send, to the first physical server, an indication of at least one of the particular service instance or the second physical server.

16. The system of claim 15, comprising further computer-executable instructions that, when executed by the one or more processors, cause the one or more processors to:

determine network latencies between the first physical server and the individual physical servers of the cluster of physical servers on which individual service instances are running; and determine that a network latency between the first physical server and the second physical server is the lowest of the network latencies, wherein the second physical server is identified as being nearest to the first physical server based at least in part on the network latency being the lowest of the network latencies.

17. The system of claim 15, comprising further computer-executable instructions that, when executed by the one or more processors, cause the one or more processors to:

determine, using the infrastructure data, locations of the individual physical servers of the cluster of physical servers on which individual service instances are running; and determine, from the locations, that a first location of the first physical server is nearest a second location of the second physical server from among the locations of the individual physical servers, wherein the second physical server is identified as being nearest to the first physical server based at least in part on the first location being nearest the second location.

18. The system of claim 15, comprising further computer-executable instructions that, when executed by the one or more processors, cause the one or more processors to:

determine a ranked list of the service instances, wherein the service instances are ranked in the ranked list based at least in part on how near the first physical server is to the individual physical servers on which the service instances are running; and send the ranked list of the service instances to the first physical server.

19. The system of claim 15, wherein the first physical server is the same as the second physical server.

20. The system of claim 15, wherein:

the first physical server is different than the second physical server; and the second physical server on which the particular service instance is running is nearest the first physical server such that, at least one of:

the application container accesses the particular service instance with the least amount of network latency from among the group of services instances; or the first physical server is located nearest the second physical server from among the cluster of physical servers.

* * * * *